March 30, 1965     I. S. MEYER     3,176,268

EMERGENCY WARNING SYSTEM

Filed Dec. 7, 1962     2 Sheets-Sheet 1

INVENTOR.
IRVING S. MEYER
BY Kimmel & Crowell
ATTORNEYS.

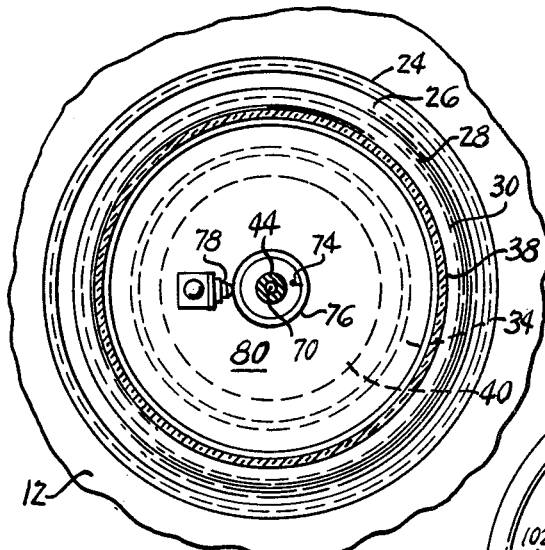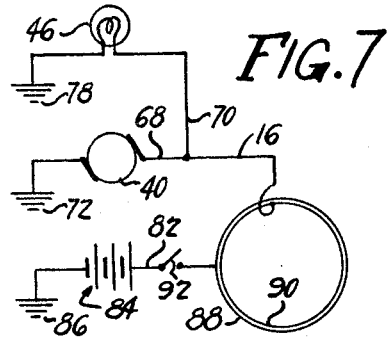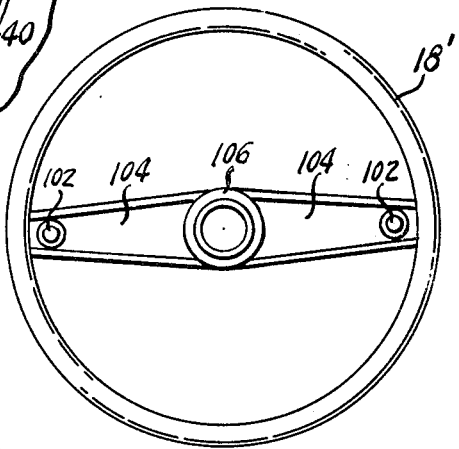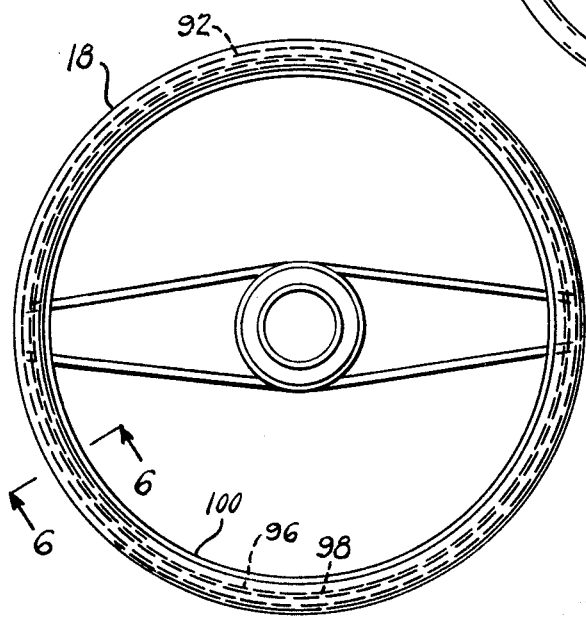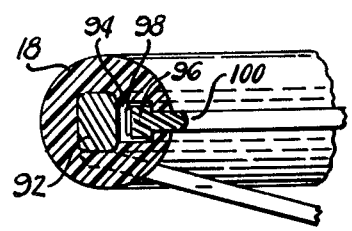

United States Patent Office 3,176,268
Patented Mar. 30, 1965

3,176,268
EMERGENCY WARNING SYSTEM
Irving Stanley Meyer, 175 W. 81st St., New York, N.Y.
Filed Dec. 7, 1962, Ser. No. 243,084
5 Claims. (Cl. 340—88)

This invention relates to an emergency warning system and relates more particularly to a combined high intensity siren and rotating lamp for use with a private passenger car or the like to indicate either mechanical difficulty of the vehicle or physical illness of the operator.

A primary object of the instant invention is the provision of a warning system which will emit both audible and visual indication that the driver or the vehicle is disabled.

Another object of this invention is to provide a visual and audible signal which can be seen and heard for at least a half mile distance in any direction.

A further object of this invention is to provide such a device which may be used on vehicles including, but not restricted to, metal bodied passenger cars, buses, trains, aircraft, watercraft, and the like.

Another object of the instant invention is the provision of such a warning system having control means within immediate vicinity of the operator of the vehicle for easy actuation.

Still another object of this invention is the provision of a unit warning system including both a siren and a lamp which is inexpensive to manufacture, dependable in operation, and easy to use.

Other and further objects reside in the combinations of elements, arrangements of parts, and features of construction.

Still other objects will in part be obvious and in part be pointed out as the description of the invention proceeds and as shown in the accompanying drawings wherein:

FIGURE 4 is a transverse cross-sectional view taken on line 4—4 of FIGURE 2, with parts broken away for illustrative clarity;

FIGURE 5 is an enlarged plan view of a steering wheel incorporating one embodiment of control means in accordance with the instant inventive concept and taken on line 5—5 of FIGURE 1;

FIGURE 6 is a fragmentary enlarged cross-sectional view taken on line 6—6 of FIGURE 5;

FIGURE 7 is a schematic diagram of the circuitry for the emergency warning system particularly with reference to the control means of FIGURES 5 and 6; and FIGURE 8 is a plan view of a further embodiment of control means for the emergency warning system of the instant invention.

Similar reference characters refer to similar parts throughout the several views of the drawings.

Figure 1:
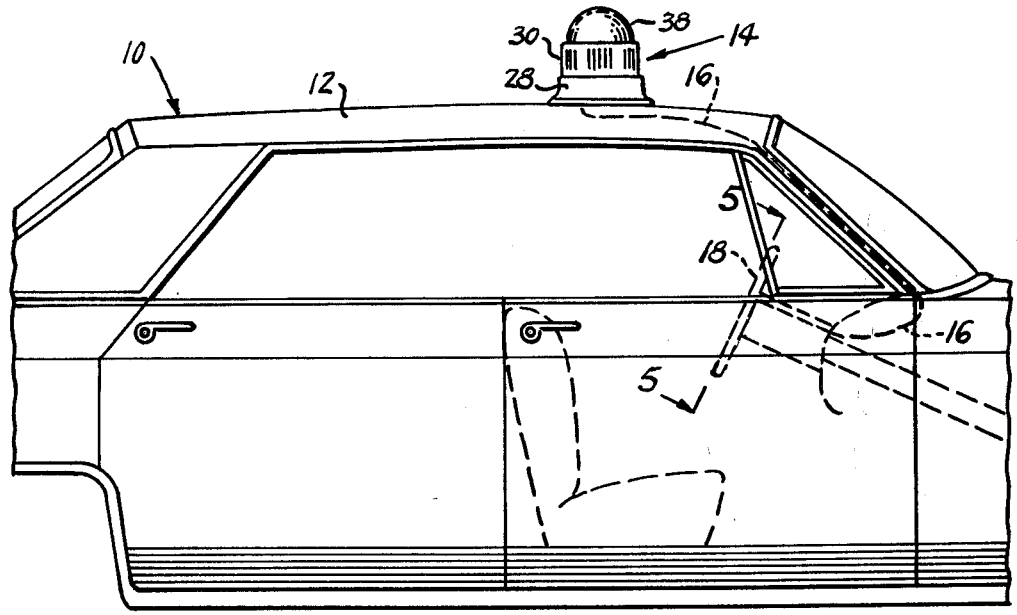
FIGURE 1 is a fragmentary side elevational view of an ordinary passenger car incorporating the emergency warning system of the instant invention.

Referring now to the drawings in general, and more particularly to FIGURE 1, an ordinary passenger car is shown fragmentarily at 10 having mounted on its roof 12 a domed element 14 incorporating the siren and lamp of the emergency warning system of the instant invention. An insulated conductor 16 shown in dotted lines electrically connects the operating mechanism within the overlying hemispherically domed element 14 to a control means to be described in further detail hereinafter and preferably mounted on the steering wheel 18 or the like.

The domed element 14 includes a base member 20 secured to the roof 12 of the vehicle 10 by any conventional means, such as screws 22 or the like, and holding in place a rimmed member 24 secured over an outwardly extending flange 26 on a lower casing member portion 28. An upper casing member portion 30 having a plurality of apertures 32 in its cylindrical wall for a purpose to be described further, is secured to the lower casing member 28 in any conventional manner and forms the outer member of the siren indicated generally by the reference numeral 34. Overlying a lamp 46 is a hemispherical dome 38 formed from either a clear or colored transparent glass or plastic.

The lower and upper casing members 28 and 30, respectively, and the base and rimmed members 20 and 24, respectively, including inturned ceiling flange 72 and plate 80, are formed of metal and act as a ground as will be further explained hereinafter.

Figures 2, 3:
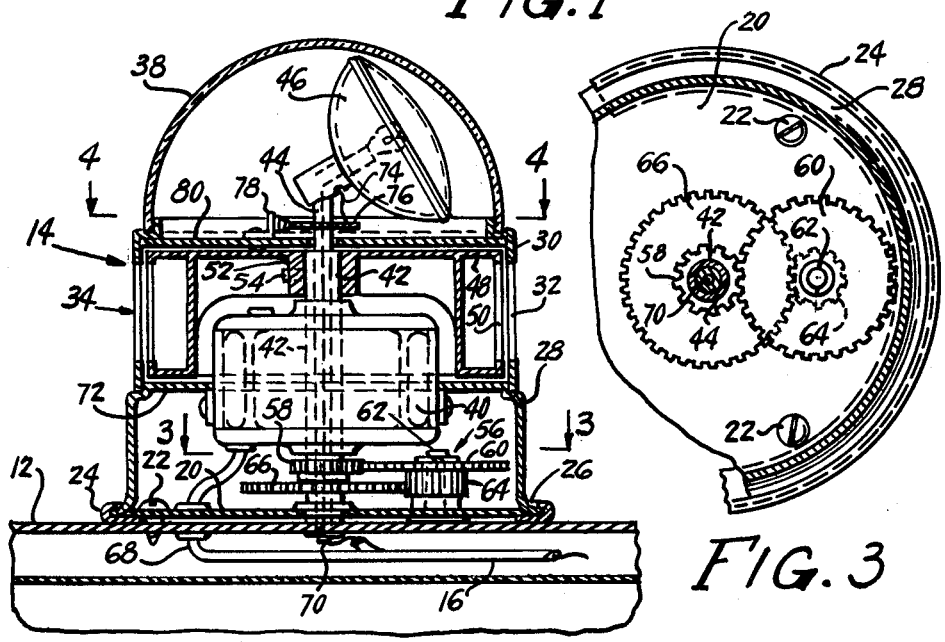
FIGURE 2 is an enlarged vertical cross-sectional view through the siren and lamp of an emergency warning system embodying the instant inventive concept, with parts broken away for illustrative convenience.
FIGURE 3 is a fragmentary transverse cross-sectional view taken on line 3—3 of FIGURE 2.

A motor 40 has a hollow motor shaft member 42 passing through its center and extending as stub shafts both above and below the motor casing. A hollow lamp shaft member 44 passes with clearance through the hollow interior of the motor shaft member 42 and has a portion extending both above and below the extremities of the motor shaft member 42. Means (not shown) are provided adjacent both the top and bottom of the lamp shaft member 44 to rotatably support the same. A high intensity lamp 46 is secured to the top of the lamp shaft member 44, inclined at approximately a 45° angle from the horizontal, and in the embodiments shown in FIGURE 2 consists of a powerful sealed beam light capable of being seen over long distances.

The siren 34 has an inner rotor member 48 with a plurality of apertures 50 around its periphery and a depending collar 52 secured by means of a set screw or the like 54 to the motor shaft member 42 for rotation therewith.

A gear reduction means 56 is provided to rotate the lamp 46 at a much slower speed compared to the rotation of the inner rotor siren member 48. The gear reduction means 56 consists of a first small gear 58 secured to the lower end of the motor shaft member 42 and intermeshing with a first large gear 60 which is secured to a rotatably mounted gear shaft member 62. Also, fixed to the gear shaft member 62 is a second small gear 64 which intermeshes with a second large gear 66 secured to the portion of the lamp shaft member 44 extending below the motor shaft member 42. Note particularly FIGURE 3.

The conductor 16 leading to the control means has a first element 68 connected to a conductor which passes directly to the motor 40 and a second element 70 passing through the hollow interior of the lamp shaft member 44 to the lamp 46. It will be noted that the motor 40 is supported and grounded by being attached to an inwardly directed ceiling flange 72 formed integral with the lower casing member 28.

The lamp 46 is grounded by connecting a conductor 74 to a ring member 76 secured to the upper portion of the lamp shaft member 44 for rotation therewith. A spring pressed contact button 78 is maintained in engagement with the ring member 76 and is grounded by being secured to a plate member 80 in contact with the upper casing member 30. Note particularly FIGURES 2 and 4.

To complete the circuitry, a battery, preferably the ordinary vehicle battery 84, is grounded as at 86. An insulated conductor 82 extends from the battery to one of two spaced contacts 88. An insulated conductor 16 is connected to the other spaced contact 90. A switch 92 may be included in the circuit to enable the operator to completely de-energize the device of the instant invention. Note FIG. 7.

In FIGS. 5 and 6 a preferred embodiment of the spaced contacts is shown wherein the contact 90 is shown as a rigid contact ring 92 embedded in the insulating rim of steering wheel 18. A radially inwardly opening groove 94 is defined within the steering wheel 18, and the groove communicates with the rigid contact ring 92. Secured within the groove 94 is a resilient contact ring 96 having an inner conducting surface 98 normally spaced from the rigid contact ring 92 in a manner similar to the spacing between contacts 88 and 90 and having an insulated portion 100 extending radially inwardly of the steering wheel 18. By distorting the ring 96 the conducting portion 98 may be pressed into contact with the rigid contact ring 92 at any portion around its periphery to close the circuit to thereby energize the motor 40 and illuminate the lamp 46.

Another embodiment of contact means to energize the device of the instant invention is shown in FIGURE 8 wherein a pair of buttons 102 are mounted on the braces 104 extending from the steering column 106 to the steering wheel 18. It is to be understood that the buttons 102 may be placed anywhere convenient to the operator of the vehicle and are shown on the steering wheel since this position is preferred. The buttons 102 consist of a first element (not shown) connected to the conductor 16 which extends along the underside or is embedded within the brace 104 and passes through the steering column 106 to the motor 40 and lamp 46, and a normally spaced spring-pressed second element (not shown) connected to the battery 84. These spaced elements correspond to the spaced contacts 88 and 90 shown in FIGURE 7.

The use and operation of the device of the instant invention will now be apparent. In the event of disablement of the vehicle or illness to the operator, he may easily close the circuit from the battery 84 to the motor 40 and lamp 46 by either pressing inwardly on the insulated portion 100 of the flexible contact ring 96 in the embodiments of FIGURES 5 and 6 or pressing one of the buttons 102 in the embodiment of FIGURE 8. When the motor 40 is energized it will rotate the inner member 48 of the siren 34 at a fast speed so that the air rushing past the apertures 50 and 32, respectively, causes a high intensity whistling noise to be emitted. The gear reduction means 56 decreases the rotative speed transmitted from the motor shaft member 42 through the lamp shaft member 44 to the lamp 46 and causes it to turn slowly within the dome 38 emitting a bright beam of light which can be seen for an extended distance. It is to be understood that any means may be provided to maintain the circuitry closed in the event that the operator is unable to hold the spaced contacts 88 and 90 together by pressing on the ring 96 or the buttons 102 due to illness or the like. Also, any conventional means may be provided to release the contacts 88 and 90 and return them to their normal spaced relationship.

It will be seen that not only will this device function to indicate disablement of the vehicle or its operator, but it may be used to show any situation of danger, such as the attempt of someone to rob the automobile or the like. The same construction could also be applicable for use on emergency vehicles such as police cars, ambulances, fire trucks or the like.

It will now be seen that there is herein provided a device which satisfies all of the objectives of the instant invention, and others, including many advantages of great practical utility and commercial importance.

Since many embodiments may be made of this inventive concept and since many modifications may be made of the embodiments hereinbefore shown and described, it is to be understood that this description is to be merely considered as illustrative, and not in a limiting sense.

I claim:

1. In an emergency warning system for a metal bodied vehicle containing a grounded battery and a switch controlled and insulated electrical conductor leading from the battery, and a combined audible and visual signal device grounded to and mounted as a single unit on the grounded roof of said vehicle, the improvement comprising in combination a casing for the device including a vertical axis lower cylindrical metal portion with means to secure it to the roof, an upper coaxial cylindrical metal portion secured to said lower portion, and an overlying hemispherical transparent dome secured to said upper portion, a base member secured to the cylindrical wall of said lower casing portion, and an annular inturned ceiling for said latter portion, said ceiling of said lower casing portion also functioning as a floor for said upper casing portion, said upper casing portion having apertures throughout its cylindrical wall, and being closed near the top of said walls by a circular plate member, said plate member possessing an axial aperture and an upturned rim of a diameter such as to contact the interior of the base of said dome, a high speed vertical axis hollow shafted electric motor supported from and within said annular inturned ceiling and grounded thereto, said electric motor extending vertically into both said first and second casing portions and presenting upper and lower stub shafts in both of said portions, a high speed siren rotor within said upper casing and directly connected to said upper stub shaft, said siren rotor presenting peripheral apertures adjacent to and similar in size to said apertures in said upper casing portion, a hollow lamp shaft member passing with clearance through the interior of the hollow motor shaft and the motor shaft stub shafts, said lamp shaft member provided with upper and lower extensions protruding beyond the stub shafts of said motor, the upper extension possessing lamp grounding means to the casing, geared speed reduction means rotatably driving the lower extension of said lamp shaft from the lower stub shaft of said motor, a high intensity lamp inclinedly secured to the top of the lamp shaft, and within said hemispherical dome, and grounded to said upper casing portion, and parallel insulated conductor branches from said insulated electrical conductor means leading individually to said motor and said lamp, so as to pass energizing current through each, then to their ground connections and finally back to said battery by way of the grounded body of the vehicle.

2. An emergency warning system in accordance with claim 1 wherein said geared reduction means includes a vertical gear shaft member rotatably supported in spaced relation to said lower stub shaft member, a first small gear secured to the lower stub shaft member, a first large gear secured to said vertical gear shaft member and intermeshing with said first small gear, a second small gear also secured to said vertical gear shaft member, and a second large gear secured to the lower extension of said lamp shaft member and intermeshing with said second small gear.

3. An emergency warning system in accordance with claim 1 wherein said means connecting said lamp to ground includes a ring member secured to the upper lamp shaft extension, a conductor connecting said lamp with said ring member, a spring-pressed button positioned to contact said ring member, and a grounding and button supporting means mounted on said circular plate member of said upper casing portion.

4. An emergency warning system in accordance with claim 1 wherein said switch control means in said conductor leading from the battery includes, between its ends, the improvement comprising, a steering mechanism with a rigid wheel rim of insulating material, a rigid contact ring embedded within said wheel rim, means defining a groove along the inner periphery of said steering wheel opening into communication with said rigid contact ring, a resilient contact ring supported within said groove and having an insulated portion guided radially inwardly through said groove, and a conducting surface thereon normally spaced from said rigid contact ring whereby said conducting surface may be pressed into contact with said rigid contact ring by radial outward pressure on said resilient ring, and means to connect said rigid contact ring and said conducting surface of said resilient contact ring in series as a part of said conductor leading from said battery.

5. An emergency warning system in accordance with claim 1 wherein said switch control means in said conductor leading from the battery includes, between its ends, the improvement comprising, a steering mechanism with a brace mounting a wheel rim on a steering column, and at least one normally open spring pressed switch button insulated from and mounted on said brace and with terminal means which connects said switch in series as a part of said conductor leading from said battery.

References Cited by the Examiner

UNITED STATES PATENTS

| 2,172,413 | 9/39 | Scott | 340—405 |
| 2,220,222 | 11/40 | Duncan | 340—405 |
| 2,268,476 | 12/41 | Duncan | 340—405 |
| 2,766,448 | 10/56 | Ritchey | 340—405 |
| 2,814,029 | 11/57 | McRea | 340—187 |
| 3,117,302 | 1/64 | Cardarelli et al. | 340—119 |

FOREIGN PATENTS 547,068    8/56    Italy.

NEIL C. READ, *Primary Examiner.*